(12) United States Patent
Mendler (10) Patent No.: US 10,408,095 B2
(45) Date of Patent: Sep. 10, 2019

(54) VARIABLE COMPRESSION RATIO ENGINE CAMSHAFT DRIVE

(71) Applicant: Edward Charles Mendler, Mill Valley, CA (US)

(72) Inventor: Edward Charles Mendler, Mill Valley, CA (US)

(*) Notice: Subject to any disclaimer, the term of this patent is extended or adjusted under 35 U.S.C. 154(b) by 250 days.

(21) Appl. No.: 15/731,416

(22) PCT Filed: Jan. 4, 2016

(86) PCT No.: PCT/US2016/000001
§ 371 (c)(1),
(2) Date: Jun. 5, 2017

(87) PCT Pub. No.: WO2016/111905
PCT Pub. Date: Jul. 14, 2016

(65) Prior Publication Data
US 2017/0328243 A1    Nov. 16, 2017

Related U.S. Application Data (60) Provisional application No. 62/124,863, filed on Jan. 5, 2015.

(51) Int. Cl.
*F01L 1/348* (2006.01)
*F02B 67/04* (2006.01)
(Continued)

(52) U.S. Cl.
CPC .............. *F01L 1/348* (2013.01); *F01L 1/022* (2013.01); *F01L 1/024* (2013.01); *F01L 1/047* (2013.01);
(Continued)

(58) Field of Classification Search
CPC .............. F16H 2007/0874; F16H 7/08; F16H 2007/0812; F16H 2007/0893; F02B 75/041
(Continued)

(56) References Cited

U.S. PATENT DOCUMENTS

| 1,581,624 A * | 4/1926 | Wunderlich | F02B 67/06 |
| | | | 123/90.31 |
| 2,129,107 A * | 9/1938 | Taylor | F16H 7/08 |
| | | | 474/110 |

(Continued)

FOREIGN PATENT DOCUMENTS

| WO | PCT/US2013/000023 | 10/2005 | |
| WO | WO/2005/098281 | 10/2005 | |
| WO | WO-2005098281 A1 * | 10/2005 | F01L 1/022 |

OTHER PUBLICATIONS

DRANGLEL: The Variable Compression (SVC) and the Combustion Control (SCC); Society of Automotive Engineers technical paper No. 2002-01-0996, US Publication date Mar. 2002.
(Continued)

Primary Examiner — Henry Y Liu (57) ABSTRACT

An endless band drive system having a variable center distance between the drive pulley and the driven pulley also has a rotatable control shaft and an endless band guide, where the guide is positioned by the rotatable control shaft for maintaining a slackless endless band with change of pulley center distance. Rotation of the control shaft pivots the endless band guide thereby maintaining a slackless endless band with change of the pulley center distance. Preferably, the rotatable control shaft also provides means for adjusting the center distance between the drive pulley and the driven pulley. The present invention provides a slackless endless band system for a variable compression ratio engine having a variable center distance between the
(Continued)

drive pulley mounted on the crankshaft and the driven pulley mounted on the camshaft. The system provides slackless operation of the endless band at two or more compression ratio values.

19 Claims, 9 Drawing Sheets

(51) Int. Cl.
| | |
|---|---|
| F02B 75/04 | (2006.01) |
| F01L 1/02 | (2006.01) |
| F01L 1/047 | (2006.01) |
| F02B 67/06 | (2006.01) |
| F16H 7/12 | (2006.01) |
| F02D 15/02 | (2006.01) |
| F16H 7/08 | (2006.01) |

(52) U.S. Cl.
CPC .............. *F02B 67/04* (2013.01); *F02B 67/06* (2013.01); *F02B 75/041* (2013.01); *F16H 7/1281* (2013.01); *F02B 75/04* (2013.01); *F02D 15/02* (2013.01); *F16H 2007/0802* (2013.01); *F16H 2007/0865* (2013.01); *F16H 2007/0872* (2013.01); *F16H 2007/0874* (2013.01); *F16H 2007/0893* (2013.01)

(58) Field of Classification Search
USPC ......................................................... 474/111
See application file for complete search history.

(56) References Cited

U.S. PATENT DOCUMENTS

| | | | | |
|---|---|---|---|---|
| 2,210,276 A * | 8/1940 | Bremer | .................. | F16H 7/0848 474/110 |
| 3,856,101 A * | 12/1974 | Allison | .................... | B62D 3/02 180/425 |
| 3,888,217 A * | 6/1975 | Hisserich | ................ | F01L 1/024 123/90.15 |
| 4,174,683 A * | 11/1979 | Vivian | .................... | F01L 1/352 123/346 |
| 4,177,683 A * | 12/1979 | Moses | ..................... | F16H 15/40 476/30 |
| 4,177,689 A * | 12/1979 | Zeilinger | ................ | F01L 1/024 123/90.31 |
| 4,354,459 A * | 10/1982 | Maxey | .................... | F01L 1/348 123/190.2 |
| 5,152,261 A * | 10/1992 | Butterfield | .......... | F01L 1/34409 123/502 |
| 5,562,069 A * | 10/1996 | Gillbrand | .............. | F02B 75/041 123/48 C |
| 5,611,301 A * | 3/1997 | Gillbrand | .............. | F02B 75/047 123/195 C |
| 5,967,922 A * | 10/1999 | Ullein | ....................... | F01L 1/02 474/111 |
| 6,322,469 B1 * | 11/2001 | Markley | ............... | F16H 7/1236 474/110 |
| 6,322,470 B1 * | 11/2001 | Markley | ................... | F16H 7/08 474/111 |
| 6,358,169 B1 * | 3/2002 | Markley | .................. | F02B 67/06 474/111 |
| 6,849,015 B2 * | 2/2005 | Markley | ............... | F16H 7/0848 474/109 |
| 6,955,621 B2 * | 10/2005 | Wigsten | ................ | F16H 7/0848 474/110 |
| 7,036,468 B2 * | 5/2006 | Kamiyama | ........... | F02B 75/041 123/78 R |
| 7,047,917 B2 * | 5/2006 | Akihisa | ................. | F02B 75/041 123/48 R |
| 7,097,579 B2 * | 8/2006 | Markley | .................. | F16H 7/08 474/101 |
| 7,429,226 B2 * | 9/2008 | Tryphonos | .............. | F01L 1/024 474/109 |
| 7,476,168 B2 * | 1/2009 | Markley | ............... | F16H 7/0829 474/111 |
| 7,721,688 B2 * | 5/2010 | Kamiyama | ........... | F02B 75/041 123/41.84 |
| 7,806,092 B2 * | 10/2010 | Kamiyama | ............... | F02F 7/00 123/195 C |
| 7,917,279 B2 * | 3/2011 | Akihisa | ................. | F02B 31/085 123/48 C |
| 7,997,241 B2 * | 8/2011 | Kamiyama | ......... | F01L 13/0015 123/90.17 |
| 8,052,558 B2 * | 11/2011 | Markley | ............... | F16H 7/0848 474/111 |
| 8,392,095 B2 * | 3/2013 | Nakasaka | ........... | F02D 13/0246 123/48 C |
| 8,608,601 B2 * | 12/2013 | Kim | ......................... | F16H 7/08 474/101 |
| 8,671,894 B2 * | 3/2014 | Kodama | .................. | F01L 1/02 123/48 C |
| 8,979,684 B2 * | 3/2015 | Markley | ............... | F16H 7/0831 474/111 |
| 9,080,640 B2 * | 7/2015 | Markley | ................... | F16H 7/08 |
| 9,188,202 B2 * | 11/2015 | Markley | ................... | F16H 7/08 |
| 9,410,489 B2 * | 8/2016 | Miyazono | .............. | F02D 15/04 |
| 9,651,121 B2 * | 5/2017 | Kurematsu | .............. | F16H 7/18 |
| 10,184,394 B2 * | 1/2019 | Mendler | ............... | F02B 75/041 |
| 2002/0160868 A1 * | 10/2002 | Wigsten | ................ | F16H 7/0848 474/101 |
| 2004/0043854 A1 * | 3/2004 | Fraley, Jr. | ............ | B62D 5/0424 474/134 |
| 2006/0270502 A1 * | 11/2006 | Markley | ................... | F16H 7/08 474/111 |
| 2008/0070731 A1 * | 3/2008 | Vrsek | ....................... | F01L 1/348 474/134 |
| 2009/0143177 A1 * | 6/2009 | Nakano | ..................... | F01L 1/02 474/109 |
| 2009/0264232 A1 * | 10/2009 | Bauer | ....................... | F16H 7/08 474/111 |
| 2009/0325750 A1 * | 12/2009 | Wigsten | ............... | F16H 7/0831 474/111 |
| 2010/0163002 A1 * | 7/2010 | Kamiyama | ........... | F01N 13/102 123/48 C |

OTHER PUBLICATIONS

The Variable Compression (SVC) and the Combustion Control (SCC); Automotive Engineering International magaz pp. 54-57, US Publication date Apr. 2001.

* cited by examiner

VARIABLE COMPRESSION RATIO ENGINE CAMSHAFT DRIVE

This application relates to Provisional Application No. 62/124,863 having a filing date of Jan. 5, 2015.

BACKGROUND OF THE INVENTION

Chains and toothed belts are typically used to drive the camshafts of internal combustion engines. These types of endless bands are used because they maintain the timing of the camshaft relative to the crankshaft. Guides or pulleys are used to take up slack in the endless band. If there is too much slack, the endless band can jump a pulley tooth and loose correct timing. The belt can also thrash, causing noise and wear. If the endless band is to taut the endless band and guides will wear out quickly and may break. In all mass production engines, the chain guides or pulleys are positioned for providing a slackless belt that is nether too loose or too taut.

Internal combustion engine efficiency can be improved by varying the compression ratio of the engine. One method of varying the compression ratio of the engine is to vary the distance between the cylinder head of the engine and the crankshaft of the engine. A problem with these variable compression ratio engines, however, is that the center distance changes between the drive pulley on the crankshaft and the driven pulley on the camshaft. When the center distance between the drive pulley and driven pulley is reduced, the endless band becomes too slack and the drive pulley no longer turns the belt or chain. A method is needed for maintaining a slackless endless band when the center distance changes between the drive pulley on the crankshaft and the driven pulley on the camshaft.

A variable compression ratio engines having an adjustable distance between the cylinder head and crankshaft is taught by Hans Dranglel et al. of Saab Automobile Powertrain AB in Society of Automotive Engineers technical paper "The Variable Compression (SVC) and the Combustion Control (SCC)—Two Ways to Improve Fuel Economy and Still Comply with World-Wide Emission Requirements" SAE paper No. 2002-01-0996, March 2002, and in Automotive Engineering International magazine pages 54-57, April 2001. The variable compression ratio engine is also taught by Gillbrand et al. in U.S. Pat. No. 5,611,301. Referring now to FIG. 2 of U.S. Pat. No. 5,611,301, the Saab engine includes a lower crankcase section (13) and a cylinder section or cylinder jug (11) connected to the crankcase with a pivot shaft (19) on a first side of the crankcase, and control shaft or eccentric shaft (44) and rods (41) on the other side of crankcase (13). Cylinder head (26) mounted on cylinder section or cylinder jug (11) is referred to as a monohead in Society of Automotive Engineer publications. The variable compression ratio mechanism taught by Saab enables the monohead (11, 26) to pivot or tilt relative to the crankcase (13) of the engine about the pivot shaft (19).

The Saab variable compression ratio engine has a variable center distance between the drive pulley mounted on the crankshaft (14) and the driven pulley mounted on the camshaft (32). Saab teaches use of a two stage endless band system where a pair of middle pulleys rigidly attached to one another for rotation at the same speed and in the same direction is mounted on or coaxially with the pivot shaft (19). A first endless band connects the crankshaft drive pulley to the first middle pulley, and a second endless band connects the second middle pulley to the camshaft (32). The system operates at various compression ratio settings because the center distance between the first middle pulley mounted on pivot shaft (19) and crankshaft (14) never changes, and the distance between the second middle pulley mounted on pivot shaft (19) and the camshaft (32) never changes. A problem with the Saab system for driving the camshaft (32) from the crankshaft (14) is that it increases engine length.

Another variable compression ratio engine (2) having a single control shaft (20) per cylinder head (16) is taught by Mendler in International Application Number PCT/US2013/000023. Mendler does not show or teach a method for taking up slack in the camshaft drive belt when the center distance between the drive pulley (11) on the crankshaft (10) and the driven pulley (15) on the camshaft (13) is varied.

Another variable compression ratio engines having an adjustable distance between the cylinder head and crankshaft is taught by Howard C. Vivian in U.S. Pat. No. 4,174,683. The Vivian engine includes a crankcase or crankcase sub assembly (12), an upper cylinder head (10) and a cylinder block or cylinder jug (11). Upper cylinder head (10) and cylinder block or cylinder jug (11) are combined forming a monohead (10 and 11). Cylinder block or cylinder jug (11) is connected to the crankcase (12) with a pair of eccentric shafts or control shafts (13 and 14). A sprocket or drive pulley (44) is mounted on crankshaft (15) for driving toothed belt (45), and the tooth belt (45) drives sprocket or driven pulley (46) mounted on camshaft (29). FIG. 4 and column 7 of U.S. Pat. No. 4,174,683 describe "a pair of slack takeup idlers (47, 49) cooperating with an adjustable tensioning idler (48) all supported on a mounting (50) attached to one end of the cylinder block (11)." The Vivian patent does not effectively teach how the idlers (47) and (49) would be moved to take up slack. A rocker arm attached to cylinder jug (11) appears to be shown in FIG. 10, but it is not mentioned or described in the specification of U.S. Pat. No. 4,174,683.

Another variable compression ratio engines having an adjustable distance between the cylinder head and crankshaft is taught by Kodama of Toyota in U.S. Pat. No. 8,671,894, and Akihisa et al. in U.S. Pat. No. 7,047,917. The Kodama engine includes a lower crankcase (22), an upper cylinder head (3) and a cylinder block or cylinder jug (2). Cylinder head (3) and cylinder block (2) form a monohead. The Kodama engine also includes a crankshaft (4) having a crank shaft gear (8) for driving camshafts (6 and 7), a driven camshaft gear or first driven pulley (13), and a chain or belt (14) for driving the first pulley (13). Cylinder block or cylinder jug (2) is connected to the crankcase (22) with a pair of main shafts or eccentric shafts or control shafts (24) located on both sides of crankcase (22). FIG. 1 and column 10 of U.S. Pat. No. 8,671,894 teaches use of a rotation transmission shaft (5) to accommodate change of the center distance between the crankshaft gear (8) mounted on the crankshaft (4) and the camshaft gear or driven pulley (13) mounted on camshaft (7). A first problem with the system taught by Kodama for driving camshaft (7) with crankshaft (4) is the cost and complexity of rotation transmission shaft assembly (5). Another problem with the Kodama system for driving the camshaft (7) from the crankshaft (4) is that it increases engine length.

Accordingly, an objective of the present invention is to provide a slackless endless band system for a variable compression ratio engine having a variable center distance between the drive pulley mounted on the crankshaft and the driven pulley mounted on the camshaft. The system should provide slackless operation of the endless band at two or more compression ratio values. The system should also have a small size, and in particular, not increase engine length. The endless band system for the variable compression ratio engine should also provide durability, noise, system cost and frictional loss values that are similar or no worse than current production endless band drive systems for internal combustion engines that do not have a variable compression ratio.

SUMMARY OF THE INVENTION

According to the present invention, an endless band drive system having a variable center distance between the drive pulley and the driven pulley also has a rotatable control shaft and an endless band guide, where the guide is positioned by the rotatable control shaft for maintaining a slackless endless band with change of pulley center distance. In more detail, rotation of the control shaft pivots the endless band guide thereby maintaining a slackless endless band with change of the pulley center distance.

Preferably, according to the present invention, the rotatable control shaft also provides means for adjusting the center distance between the drive pulley and the driven pulley. In variable compression ratio engines, according to the present invention, the control shaft adjusts the compression ratio of the engine and also repositions the endless band guide for slackless operation of the endless band at two or more compression ratio settings.

The present invention provides a slackless endless band system for a variable compression ratio engine having a variable center distance between the drive pulley mounted on the crankshaft and the driven pulley mounted on the camshaft. The system provides slackless operation of the endless band at two or more compression ratio values. The system also have a small size, and in particular, does not increase engine length. The endless band system for the variable compression ratio engine also provide durability, noise, system cost and frictional loss values that are similar to that of current production endless band drive systems for internal combustion engines that do not have a variable compression ratio. Other embodiments and attributes of the present invention are described in the Detailed Description of the Preferred Embodiments of the present invention.

DETAILED DESCRIPTION OF THE PREFERRED EMBODIMENTS

Figure 1:
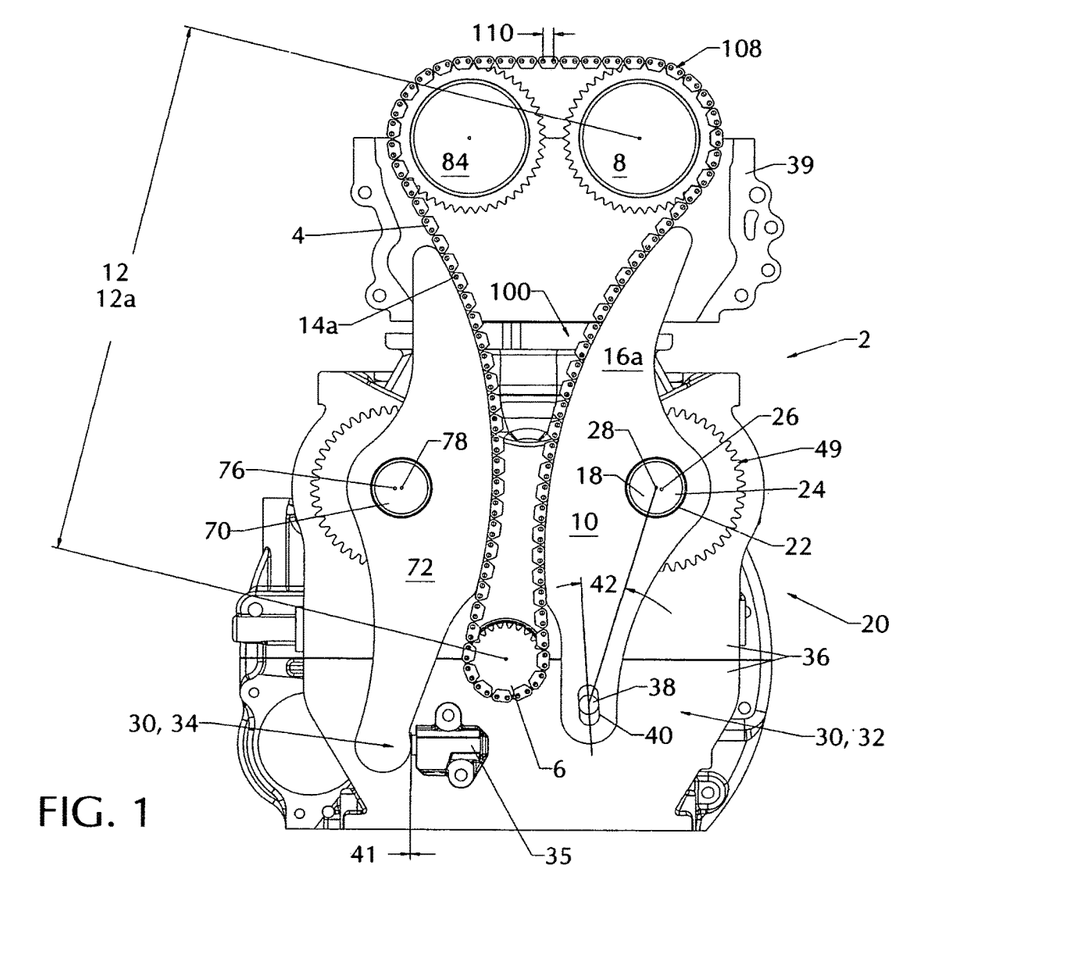
FIG. 1 is intended to schematically illustrate an endless band drive system according to the present invention.
Figure 2:
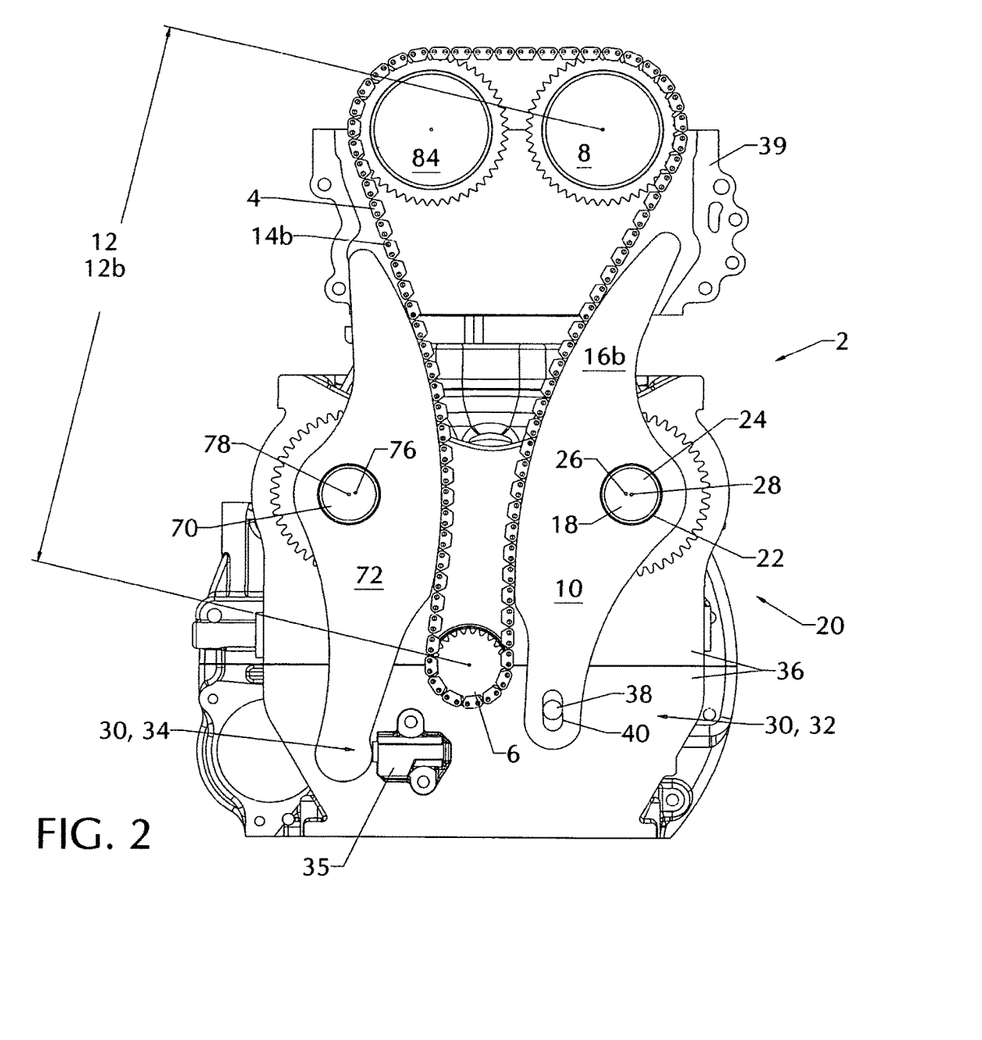
FIG. 2 is similar to FIG. 1 but shows a larger center distance between the drive pulley and the first driven pulley.
Figure 8:
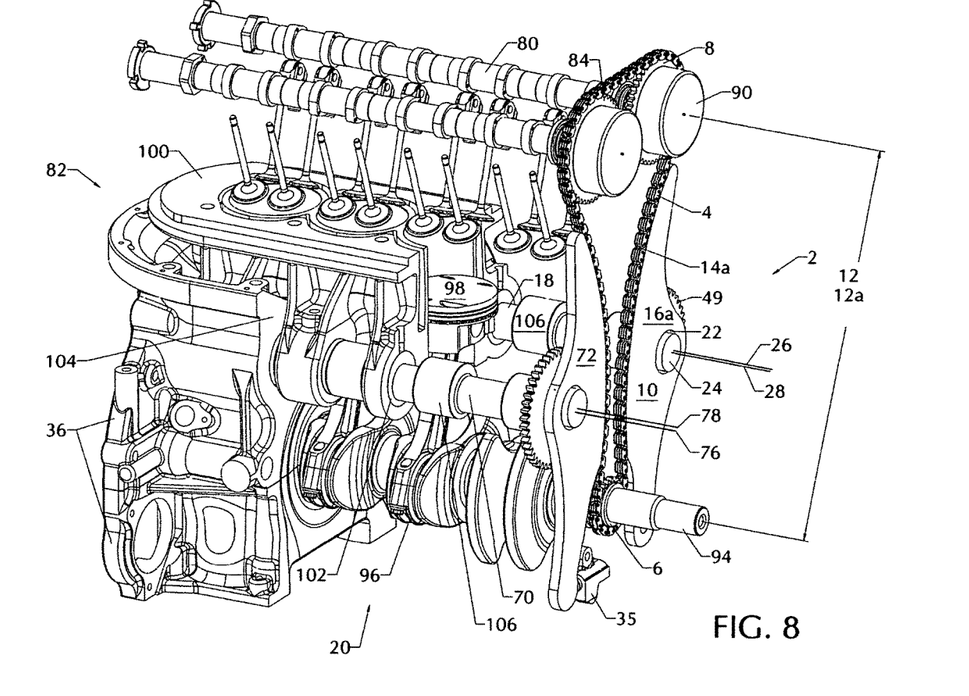
FIG. 8 is another view of the embodiment of the present invention illustrated in FIG. 1.

FIGS. 1, 2 and 8 are intended to illustrate an endless band drive system 2 having an endless band 4, a drive pulley 6, a first driven pulley 8, and a first guide 10 in contact with endless band 4. The endless band drive system 2 further includes a variable center distance 12 between drive pulley 6 and first driven pulley 8.

The endless band drive system 2 further includes a first setting having a first center distance 12a between drive pulley 6 and first driven pulley 8, and having a first slackless endless band pathway 14a, and a first guide position 16a for providing first slackless endless band pathway 14a.

The endless band drive system 2 further includes a second setting having a second center distance 12b between drive pulley 6 and first driven pulley 8, and having a second slackless endless band pathway 14b, and a second guide position 16b for providing second slackless endless band pathway 14b.

According to the present invention endless band drive system 2 further includes a first rotatable control shaft 18 for repositioning first guide 10 from first guide position 16a to second guide position 16b thereby providing slackless endless band pathways 14a and 14b at first and second guide positions 16a and 16b.

Center distance 12a shown in FIG. 1 is less than center distance 12b shown in FIG. 2. Increasing the center distance pulls the endless band taut, causing the middle portion of the endless band to move outward. First guide 10 moves outward as the center distance is increased, thereby providing a slackless endless band having generally the same endless belt tension at first center distance 12a and second center distance 12b.

Figure 3:
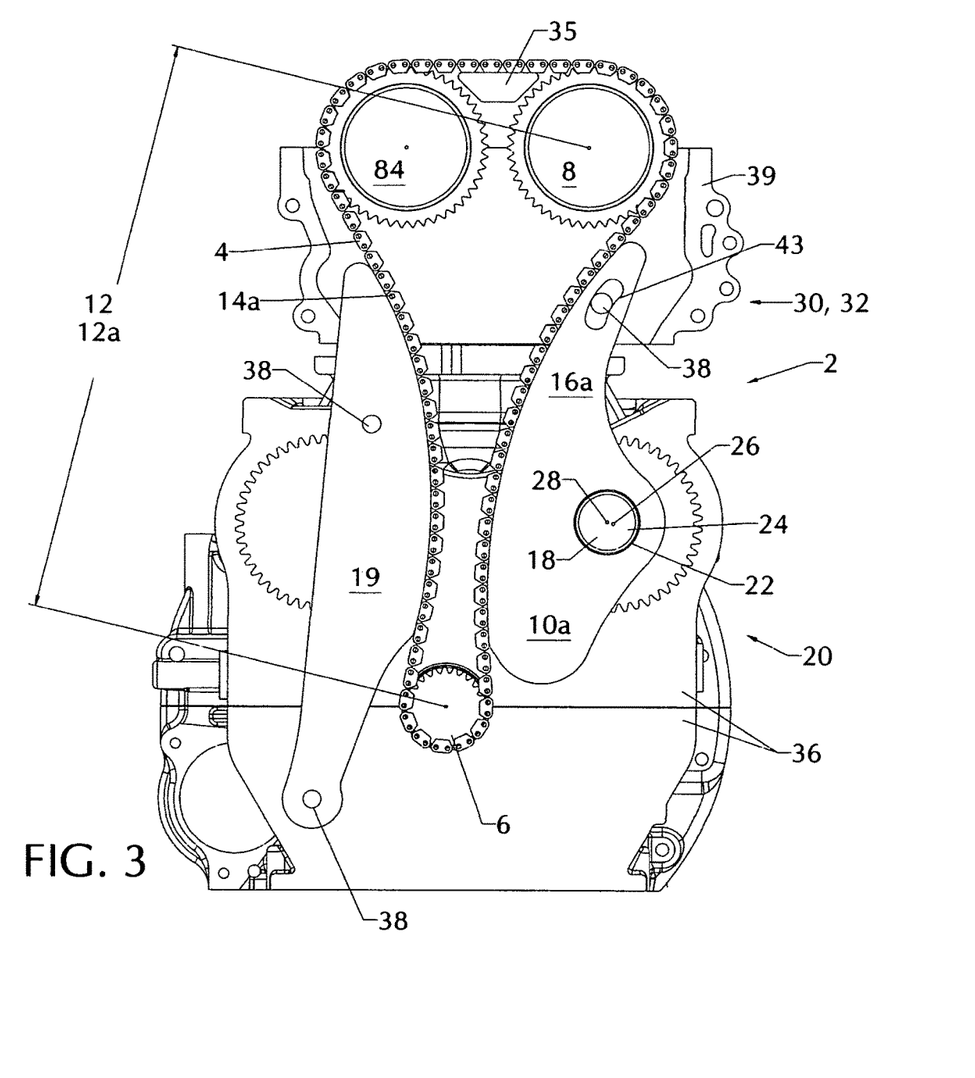
FIG. 3 is similar to FIG. 1 but shows a movable first guide and a fixed second guide.

FIG. 3 is similar to FIG. 1 but shows a second guide 19 that has a fixed position, and in more detail the second guide 19 generally remains in the same position with change of center distance 12. First guide 10a also has a curved slot 43 and an alignment pin 38. According to the present invention, a combination of movable or fixed and movable guides may be used to provide a slackless endless band for a plurality of variable center distance spacings 12.

Referring now to FIGS. 1, 2, 3 and 8, the endless band drive system 2 may optionally include variable center distance adjustment means 20 for adjusting the variable center distance 12 between drive pulley 6 and first driven pulley 8. According to the preferred embodiment of the present invention, variable center distance adjustment means 20 includes first rotatable control shaft 18 for adjusting the variable center distance 12 between drive pulley 6 and first driven pulley 8, or optionally first rotatable control shaft 18 provides the variable center adjustment means 20 for adjusting the variable center distance 12 between drive pulley 6 and first driven pulley 8.

In more detail, according to the present invention, preferably variable center adjustment means 20 includes a rotatable control shaft or control shaft assembly 18 with eccentrics 106 for adjusting center distance 12. According to the present invention, one or more control shafts may be used. FIGS. 1 and 8 show use of two control shafts, and in more detail first rotatable control shaft 18 and second rotatable control shaft 70. Prior art U.S. Pat. No. 5,611,301 shows a variable compression ratio engine having only one rotatable control shaft (44). International Patent Application No. PCT/US2013/000023 shows a variable compression ratio engine having only one rotatable control shaft (20) per cylinder head (16).

Preferably, according to the present invention, endless band system 2 has a range of settings between the first setting having a first center distance 12a and the second setting having a second center distance 12b, where the endless band 4 is generally slackless across the range of settings from first center distance 12a to second center distance 12b.

Preferably, according to the present invention, first guide 10 includes a guide pin receiving hole 22 and first rotatable control shaft 18 includes a guide pin 24, where guide pin 24 is mounted in receiving hole 22 for repositioning of first guide 10 with rotation of first rotatable control shaft 18. Rotation of first rotatable control shaft 18 further defines a control shaft axis 26, and guide pin 24 further defines a guide pin axis 28, where guide pin axis 28 is offset from control shaft axis 26 for repositioning of first guide 10 with rotation of first rotatable control shaft 18.

In FIG. 1 guide pin axis 28 is closer to endless band 4 than control shaft axis 26. In FIG. 2, control shaft 18 has rotated about one half turn, and now guide pin axis 28 is farther from endless band 4 than control shaft axis 26. First rotatable control shaft 18 may rotate more or less than one full rotation according to the present invention. For example, in some embodiments of the present invention control shaft 18 rotates less than 180 degrees, in other embodiments of the present invention control shaft 18 rotates more than 180 degrees, and yet in other embodiments of the present invention control shaft 18 rotates more than 360 degrees.

In an embodiment of the present invention, the endless band drive system 2 includes secondary alignment means 30 such as a slot follower 32, a slidable contact surface 34 or other functional means. Slidable contact surface 34 may be on a tensioner 35. FIGS. 1 and 2 show endless band drive system 2 having a housing or crankcase 36 for rotatably supporting drive pulley 6, and housing 36 having an alignment pin 38 for slot follower 32. First guide 10 includes a slot 40. Alignment pin 38 is located in slot 40 to form slot follower 32 and provide secondary alignment means 30 for first guide 10. Slot 40 has an alignment angle 42 for alignment of first guide 10 with rotation of control shaft 18. According to the present invention first guide 10 has an alignment angle 42 for providing a slackless endless band pathways 14a and 14b at first and second endless band positions 16a and 16b, and for minimizing or largely eliminating slack at variable center distances between center distance 12a and center distance 12b.

Referring now to FIG. 3, according to another embodiment of the present invention first guide 10a has a curved slot 43 for providing a slackless endless band pathways 14a and 14b at first and second endless band positions 16a and 16b, and for minimizing or largely eliminating slack at variable center distances between center distance 12a and center distance 12b.

Slidable contact surface 34 may be on tensioner 35. Tensioner 35 may also have a tensioner alignment angle 41 for providing a slackless endless band pathways 14a and 14b at first and second guide positions 16a and 16b, and for minimizing or largely eliminating slack at variable center distances between center distance 12a and center distance 12b.

Figure 4:
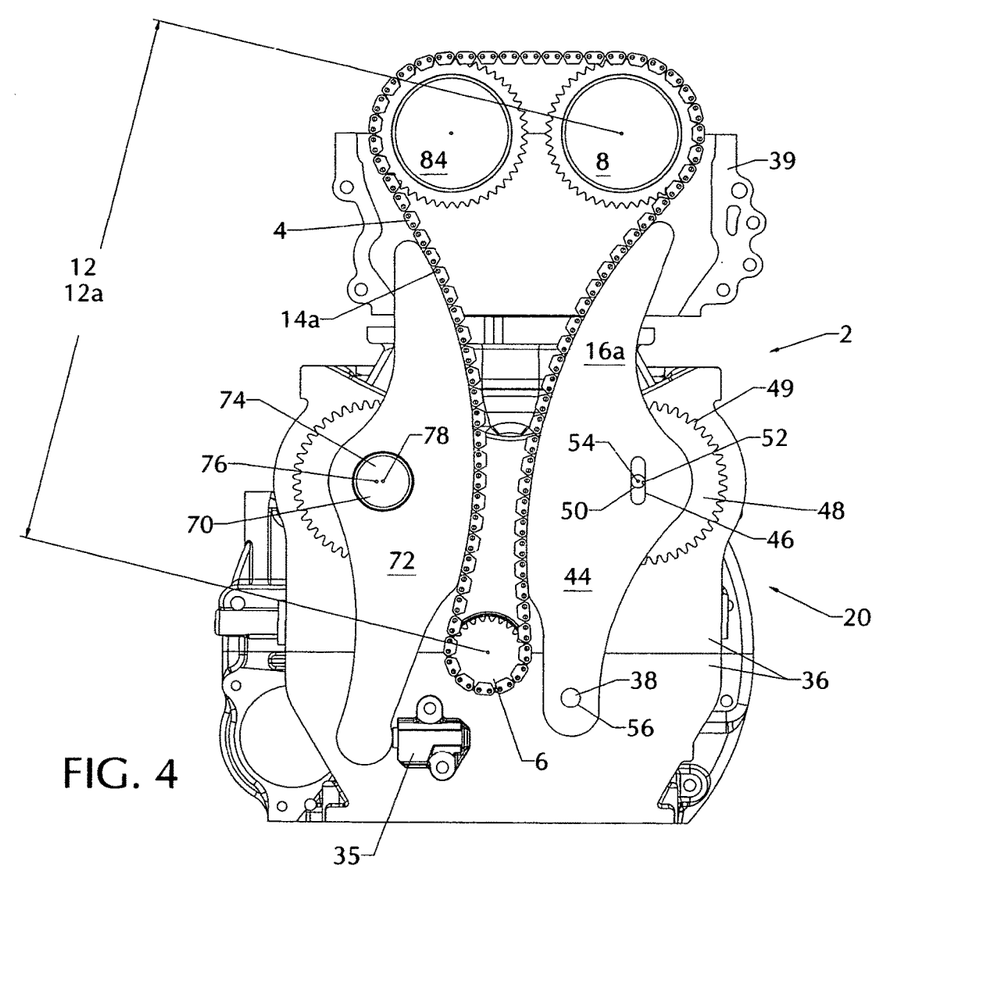
FIG. 4 is similar to FIG. 1 but shows a first guide having a slot follower.
Figure 5:
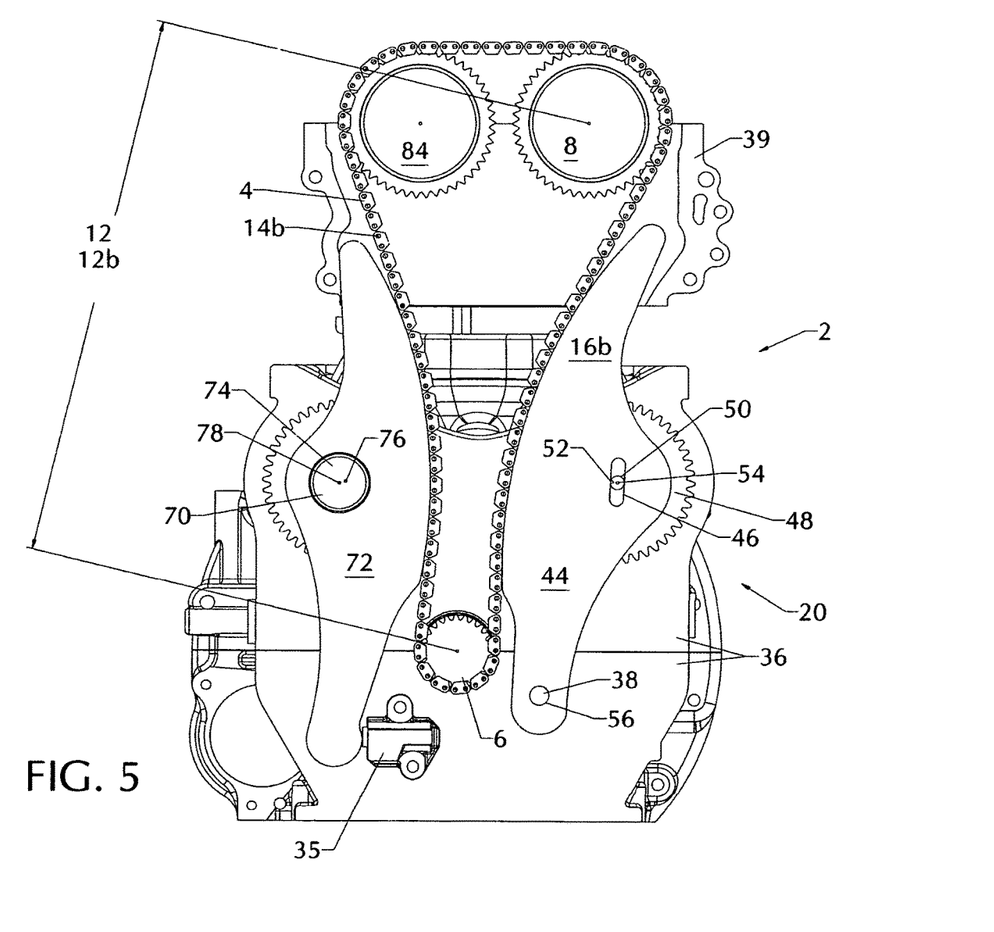
FIG. 5 is similar to FIG. 4 but shows a larger center distance between the drive pulley and the first driven pulley.
Figure 6:
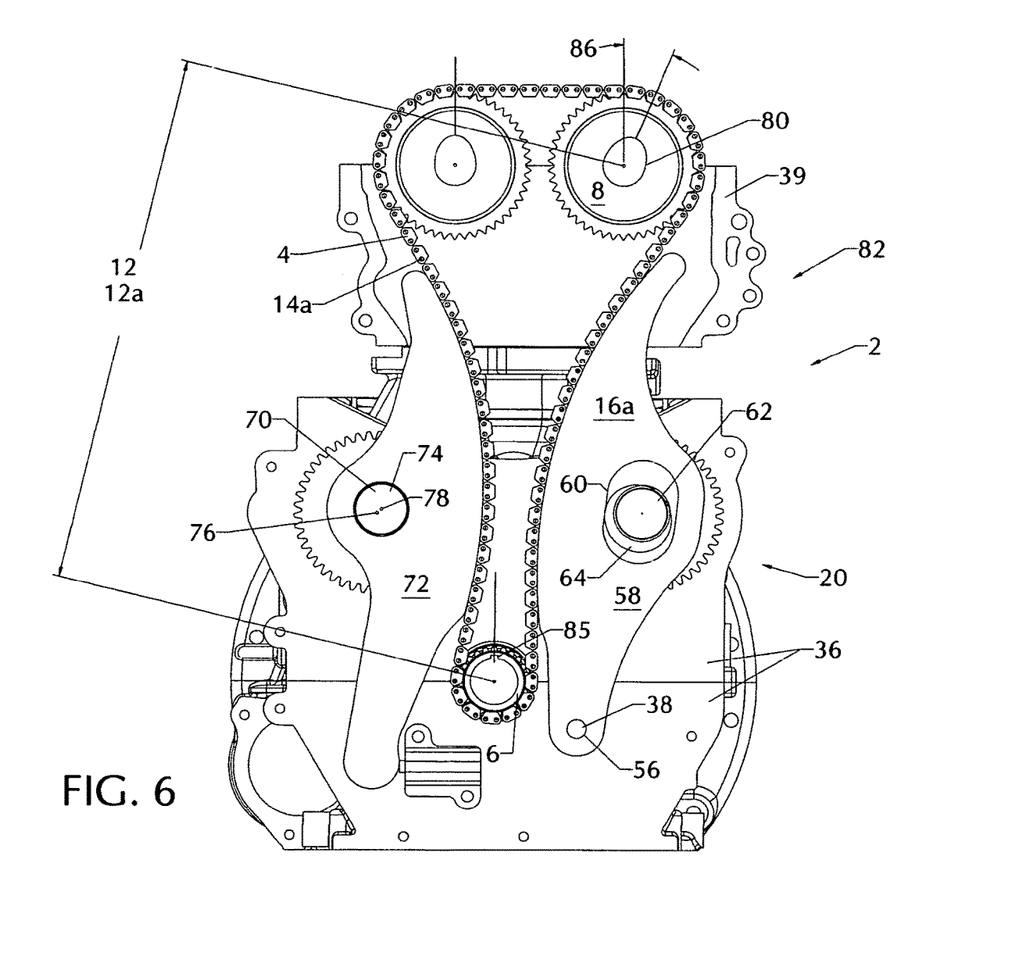
FIG. 6 is similar to FIG. 1 but shows a first guide having a positioning surface for a cam drive.
Figure 7:
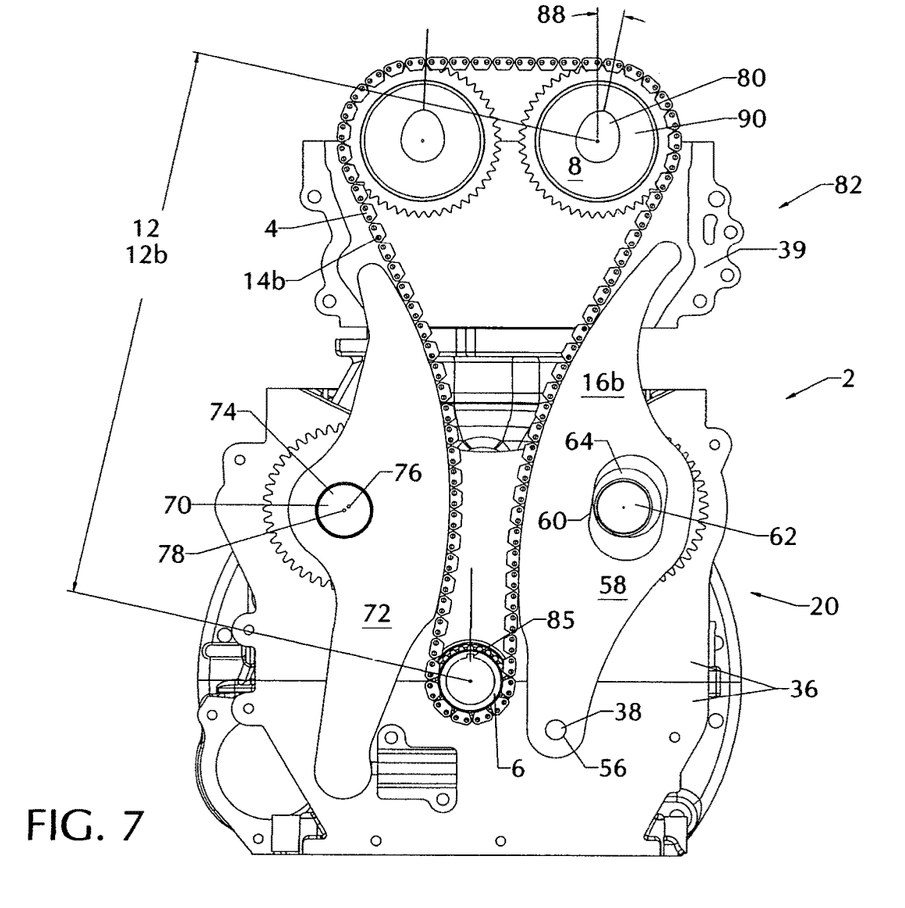
FIG. 7 is similar to FIG. 6 but shows a larger center distance between the drive pulley and the first driven pulley.
Figure 9:
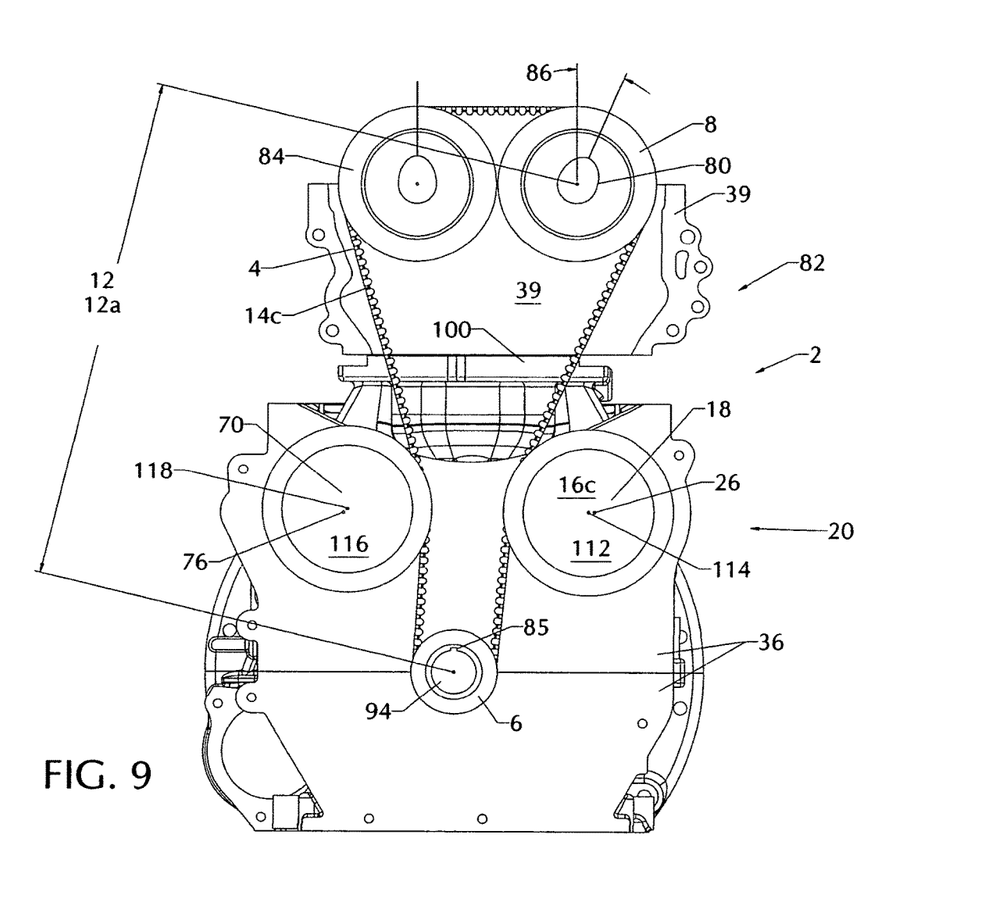
FIG. 9 shows an embodiment of the present invention where the endless band is a belt.

Different embodiments of the present invention are shown in the figures. FIGS. 1, 2 and 8 generally show a first embodiment. FIG. 3 shows another embodiment. FIGS. 4 and 5 generally show another embodiment. FIGS. 6 and 7 generally show another embodiment. And FIG. 9 shows another embodiment.

Referring now to FIGS. 4 and 5, in an embodiment of the present invention, a first guide 44 includes a guide pin slot 46 (shown) or curved slot 43 (not shown) and first rotatable control shaft 48 having a guide pin 50. The guide pin slot may optionally have an alignment angle similar to the alignment angle shown for slot 40 in FIG. 1, or a curved slot similar to curved slot 43 shown in FIG. 3, to provide secondary alignment means. First rotatable control shaft 48 is shown with integral timing or drive gears 49, however timing gears 49 are not required in some embodiments of the present invention. Guide pin 50 is mounted in slot 46 for repositioning of first guide 44 with rotation of first rotatable control shaft 48. Rotation of first rotatable control shaft 48 further defines a control shaft axis 52, and guide pin 50 further defines a guide pin axis 54, guide pin axis 54 being offset from control shaft axis 52. First guide 44 further includes a guide pin hole 56 for receiving alignment pin 38, for pivotal support of first guide 44 about alignment pin 38. Alignment pin 38 may optionally be fixed in housing 36 or free to rotate in housing 36. First driven pulley 8 is rotatably mounted in a driven pulley housing or cylinder head 39. Optionally alignment pin 38 may be mounted in driven pulley housing 39. FIG. 3 shows an alignment pin 38 in driven pulley housing 39.

Referring now to FIGS. 6 and 7, in an embodiment of the present invention, a first guide 58 includes a first guide positioning surface 60 and a first rotatable control shaft 62. First rotatable control shaft 62 includes a first guide cam 64, first guide cam 64 being in contact with first guide positioning surface 60 for repositioning of first guide 58 with rotation of rotatable control shaft 62 for providing a slackless endless band pathway 14 for more than one center distance 12. In general terms, first guide positioning surface 60 may be the same or similar to the surface of slot 46 closest to endless band 4.

Preferably, according to the present invention, first guide cam 64 provides a slackless or near slackless endless band 4 at all center distances 12.

FIGS. 6 and 7 show first guide 58 including a fixed position locating pin 38 mounted in or in fixed relationship with housing 36, and a guide pin hole 56 is first guide 58. Locating pin 38 is mounted in guide pin hole 56 for pivotally locating said first guide 58. Optionally alignment pin 38 may be mounted in driven pulley housing 39. FIG. 3 shows an alignment pin 38 in driven pulley housing 39.

Referring now to FIGS. 1, 2, 4, 5, 6, 7 and 8, endless band drive system 2 optionally includes a second rotatable control shaft 70 and a second guide 72 for providing slackless first and second endless band pathways 14a and 14b. Variable center distance means 20 may optionally include second rotatable control shaft 70.

According to the present invention, the first guide may be located on either side of endless band 4. For example, in FIG. 1 first guide 10 is shown to the right of endless band 4 and second guide 72 is shown to the left of endless band 4. According to the present invention, first guide 10 may optionally be located to the left of endless band 4 and second guide 72 may be located to the right of endless band 4.

Additionally, according to the present invention, one or more of the guides may be movable with change of variable center distance 12. For example, one guide may have a fixed location relative to housing 36, and the other guide movable, or optionally both guides may be movable with relationship to housing 36.

Referring now to FIGS. 6 and 7, endless band drive system 2 includes a second rotatable control shaft 70 having a second guide pin 74, for repositioning of second guide 72 with rotation of second rotatable control shaft 70. Rotation of second rotatable control shaft 70 further defines a second control shaft axis 76, and second guide pin 74 further defines a second guide pin axis 78, second guide pin axis 78 being offset from control shaft axis 76.

First rotatable control shaft 62 has a first guide, cam 64. First guide 58 further has a positioning surface 60 in contact with first guide cam 64 for positioning first guide 58 for slackless first and second guide positions 16a and 16b. In more detail first guide 58 has a positioning surface 60 in contact with first cam 64 for positioning first guide 58 for a first slackless endless band pathway 14a at first guide position 16a, and a second slackless endless band pathway 14b at second guide position 16b.

Referring now to FIGS. 4 and 5, endless band drive system 2 includes a second guide 72, a second rotatable control shaft 70 having a second guide pin 74, for repositioning of second guide 72 with rotation of second rotatable control shaft 70. Rotation of second rotatable control shaft 70 further defines a second control shaft axis 76, and second guide pin 74 further defines a second guide pin axis 78, second guide pin axis 78 being offset from control shaft axis 76.

First guide 44 further has a guide pin 50 for repositioning of first guide 44 with rotation of first rotatable control shaft 48 for providing a slackless endless band 4 at first and second guide positions 16a and 16b.

In more detail first guide 44 further has a guide pin 50 for repositioning of first guide 44 with rotation of first rotatable control shaft 48 for providing a first slackless endless band pathway 14a at first guide position 16a, and a second slackless endless band pathway 14b at second guide position 16b.

Rotation of first rotatable control shaft 48 further defines a first control shaft axis 52, and guide pin 50 further defines a guide pin axis 54, guide pin axis 54 being offset from first control shaft axis 52.

Optionally, according to the present invention, any combination of one or more variable center distance adjustment means 20 may be used for providing a slackless endless band pathway 14. Preferably, according to the present invention, first rotatable control shaft 18 includes variable center distance adjustment means 20 or part of variable center distance adjustment means 20.

Referring now to FIGS. 1 through 7, endless band 4 is optionally a chain, and guides 10, 10a, 44, 58 and 72 are chain guides.

Referring now to FIGS. 6 and 7, according to an embodiment of the present invention, first drive pulley 8 provides drive means for a camshaft 80, and endless band drive system 2 provides camshaft drive means for a variable compression ratio engine 82.

Camshaft 80 is schematically illustrated with the outline of camshaft 80 brought to the foreground to more clearly illustrate the camshaft. Those skilled in the field will know that the camshaft cam lobes are typically located behind the drive pulley.

The slackless endless band pathway is the pathway of the endless band when made taut by the pulleys and guides, and having generally the standard operating tension in the endless band. The slackless endless band pathway inherently has some minor variation due to stretching and aging of the endless band, assembly tolerances, imperfect tensioning of the endless band, and small variations of the endless band pathway length that may occur with change of center distance 12. These minor variations do not alter or diminish the scope of the Claims of the present invention, it being understood that minor variations will occur in actual built systems of the present invention. Accordingly, the term slackless should be interpreted to mean generally slackless.

Referring now to FIG. 1, endless band 4 may optionally be a chain. Chain 4 has links 108 and a pitch length 110. The length of the endless band pathway is approximately equal to the pitch length 110 times the number of links 108. The slackless endless band pathway of a chain is generally measured through the chain pins.

Referring now to FIGS. 1, 2 and 3, the endless band drive system of the present invention may optionally include a tensioner 35. Tensioner 35 is generally useful for fine tuning the overall length of the slackless endless band pathway 14, but not for adjusting the overall length of the slackless endless band pathway with change of variable center distance 12 over short periods of time. In more detail, tensioner 35 is useful for adjusting the endless band pathway length with aging of the endless band, which cause minor increases in endless band length.

In one embodiment of the present invention the endless band drive system 2 includes a second guide 19 or 72 and a tensioner 35 for maintaining slackless operation of the endless band drive system with aging of endless band 4. Preferably tensioner 35 is located on the slack chain guide, however this is not required. The portion of endless band 4 downstream of drive pulley 6 and upstream of the first driven pulley 8 is generally referred to as the slack portion of the endless band. Tensioner 35 is preferably located on the guide that is in contact with the slack portion of the endless band. Tensioner 35 may be located above or below control shaft 70 or 18. FIGS. 1 and 2 show tensioner 35 located on the slack chain guide 72 below second control shaft 70, assuming drive pulley 6 rotates clockwise.

Referring now to FIG. 3, in one embodiment of the present invention, the endless band drive system 2 has a second driven pulley 84, and an endless band tensioner 35 located between first driven pulley 8 and second driven pulley 84 for maintaining slackless operation of the endless band drive system 2 with aging of the endless band 4.

Referring now to FIG. 6, optionally, first guide 58 has a first guide positioning surface 60 and a first guide cam 64, and said second guide has a second positioning surface and a second guide cam for providing slackless first and second positions. This embodiment of the present invention has guide cams on both first and second control shafts. FIG. 6 shows positioning surface 60 on first guide 58 and first guide cam 64 on first rotatable control shaft 62. Those skilled in the art will understand that components of similar construction and functionality can be used on both sides of endless band 4 instead of second guide 72 shown in FIG. 6.

Referring now to FIGS. 6 and 7, endless band drive system 2 further has a first phase timing 86 between drive pulley 6 and driven pulley 8 at first center distance 12a, and a second phase timing 88 at second center distance 12b. FIGS. 6 and 7 show drive pulley 6 having a keyway 85 located at top dead center in both figures as a reference point for first phase timing 86 and second phase timing 88. According to an embodiment of the present invention, second phase timing is controlled or partially controlled by first guide cam 64 acting on positioning surface 60 shown in FIGS. 6 and 7; or guide pin 50 in guide pin slot 46 shown in FIGS. 4 and 5; or guide pin 24 in guide pin receiving hole 22 shown in FIGS. 1, 2 and 3.

In one embodiment of the present invention second phase timing 88 is different from the first phase timing 86. According to another embodiment of the present invention, second phase timing 88 is the same as first timing 86. In more detail, endless band drive system 2 has a first phase timing 86 between drive pulley 6 and driven pulley 8 at a first center distance 12a, and a second phase timing 88 at a second center distance spacing 12b, wherein first guide cam 64 acting on surface 60 or guide pin 24 in guide pin receiving hole 22 controls or partially controls first 86 and second phase 88 timings.

FIG. 7 shows a camshaft 80 attached to driven pulley 8, and a phase shifter 90 for adjusting the timing of camshaft 80 relative to first drive pulley 8. Phase shifter 90 may optionally be used to adjust cam timing in addition to phase timing adjustments provided by endless band drive system 2.

In another embodiment of the present invention the endless band drive system 2 has a first phase timing between drive pulley 6 and driven pulley 8 at first guide position 16a, and a second phase timing between drive pulley 6 and driven pulley 8 at second guide position 16b, where a first guide cam 64 on the first rotatable control shaft 18 and a second guide cam on the second rotatable control shaft 70 provide the first and second phase timings.

FIG. 8 is a partial sectional view, and shows another view of the embodiment illustrated in FIG. 1, and is intended to show how the present invention can be used in a variable compression ratio engine 82. Referring now to FIGS. 1 and 8, drive pulley 6 is mounted on a crankshaft 94 and first driven pulley 8 is mounted to camshaft 80. In the embodiment shown in FIGS. 1 and 8 endless band 4 is a chain and first guide 10 and second guide 72 are chain guides. Endless band or chain 4 is shown wrapping around drive pulley 6, first driven pulley 8 and second driven pulley 84, and chain guides 10 and 72 are positioned to take up and remove slack in chain 4. A connecting rod 96 is connected to crankshaft 94 for reciprocating motion of a piston 98. Piston 98 is slidably mounted in a cylinder jug 100. The connecting rod and piston is not shown in the first engine cylinder to expose control shaft 18. Drive pulley housing or cylinder head 39 is rigidly attached to cylinder jug 100, thereby forming a monohead. First rotatable control shafts 18 and second rotatable control shaft 70 are rotatably mounted in cylinder jug 100 preferably in jug bushings 102. First rotatable control shafts 18 and second rotatable control shaft 70 are also rotatably mounted in housing or crankcase 36 preferably in supporting buttresses 104. In more detail, in an embodiment of the present invention, eccentrics 106 on first rotatable control shafts 18 and on second rotatable control shaft 70 are also rotatably mounted in housing or crankcase 36 preferably in supporting buttresses 104. According to the present invention, eccentric shafts or control shafts 18 and 70 may each be a single piece or an assembly for repositioning eccentrics and thereby adjusting variable center distance 12 and adjusting the compression ratio of variable compression ratio engine 82. Timing gears 49 on control shafts 18 and 70 are used in the embodiment shown to rotate eccentrics 106 in the same direction and to have the same timing.

In the embodiment shown in FIG. 9 endless band 4 is a belt or cogged belt. First guide 112 is an idler pulley or rotary guide, and second guide 116 is an idler pulley or rotary guide. Endless band or belt 4 is shown wrapping around drive pulley 6, first driven pulley 8 and second driven pulley 84, and idler pulleys or guides 112 and 116 are positioned to take up and remove slack in belt 4.

FIG. 9 is intended to illustrate an endless band drive system 2 having an endless band 4, a drive pulley 6, a first driven pulley 8, and a first guide 112 in contact with endless band 4.

The endless band drive system 2 further includes a variable center distance 12 between drive pulley 6 and first driven pulley 8.

The endless band drive system 2 further includes a first setting having a first center distance 12a between drive pulley 6 and first driven pulley 8, and having a first slackless endless band pathway 14c, and a first guide position 16c for providing first slackless endless band pathway 14c.

The endless band drive system 2 further includes a second setting having a second center distance 12b between drive pulley 6 and first driven pulley 8, and having a second slackless endless band pathway, and a second guide position for providing second slackless endless band pathway.

According to the present invention endless band drive system 2 further includes a first rotatable control shaft 18 for repositioning first guide 112 from first guide position 16c to a second guide position thereby providing first and second slackless endless band pathways at first and second guide positions.

The endless band drive system 2 may optionally include variable center distance adjustment means 20 for adjusting the variable center distance 12 between drive pulley 6 and first driven pulley 8. According to an embodiment of the present invention, variable center distance adjustment means 20 includes first rotatable control shaft 18 for adjusting the variable center distance 12 between drive pulley 6 and first driven pulley 8.

Rotation of first guide 112 defines a first idler pulley axis 114, where first idler pulley axis 114 is offset from control shaft axis 26 for repositioning of first idler pulley axis 114 with rotation of first rotatable control shaft 18. Second guide or second idler pulley 116 is optionally movable, as shown in FIG. 9. Rotation of second guide 116 defines a second idler pulley axis 118, where second idler pulley axis 118 is offset from second control shaft axis 76 for repositioning of second idler pulley axis 116 with rotation of second rotatable control shaft 70.

The invention claimed is:

1. An endless band drive system (2) having an endless band (4), a drive pulley (6), a first driven pulley (8), and a first guide (58) in contact with said endless band (4),
    said endless band drive system (2) further includes a variable center distance (12) between said drive pulley (6) and said first driven pulley (8), and
    a first setting having a first center distance (12a) between said drive pulley (6) and said first driven pulley (8), and having a first slackless endless band pathway (14a), and a first guide position (16a) for providing said first slackless endless band pathway (14a), and
    a second setting having a second center (12b) distance between said drive pulley (6) and said first driven pulley (8), and having a second slackless endless band pathway (14b), and a second guide position (16b) for providing said second slackless endless band pathway (14b),
    wherein said endless band drive system (2) further includes a first rotatable control shaft (62) for repositioning said first guide (58) from said first guide position (16a) to said second guide position (16b) thereby providing a slackless endless band at said first and second endless band positions
    wherein said first guide (58) includes a first guide positioning surface (60) and rotatable control shaft (62) includes a first guide cam (64), said first guide cam (64) being in contact with said first guide positioning surface (60) for repositioning of said first guide (58) with rotation of said rotatable control shaft (62).

2. The endless band drive system of claim 1, further having a first phase timing (86) between said drive pulley (6) and said driven pulley (8) at said first setting, and a second phase timing (88) at said second setting, wherein said cam (64) provides said first and second phase timings (86 and 88).

3. The endless band drive system of claim 1, further including variable center distance adjustment means (20) for adjusting said variable center distance (12) between said drive pulley (6) and said first driven pulley (8),
wherein said first rotatable control shaft (62) provides said variable center distance adjustment means (20) for adjusting said variable center distance (12) between said drive pulley (6) and said first driven pulley (8).

4. The endless band drive system of claim 1, further having a second rotatable control shaft (70) for adjusting the center distance (12) between said drive pulley (6) and said first driven pulley (8), and a second guide (72) for providing first and second slackless endless band pathways (14*a* and 14*b*).

5. The endless band drive system of claim 4, wherein second rotatable control shaft (70) includes a second guide pin (74), for repositioning of second guide (72) with rotation of said second rotatable control shaft (70),
rotation of said second rotatable control shaft (70) further defines a second control shaft axis (76), and said second guide pin (74) further defines a second guide pin axis (78), said second guide pin axis (78) being offset from said control shaft axis (76), second guide (72) being pivotally mounted on second guide pin (74) for providing first and second slackless endless band pathways (14*a* and 14*b*).

6. The endless band drive system of claim 4, wherein said first guide (58) has a first guide positioning surface (60) and a first guide cam (64), and said second guide (72) has a second positioning surface and a second guide cam for providing first and second slackless endless band pathways (14*a* and 14*b*).

7. The endless band drive system of claim 1, further having a first phase timing (86) between said drive pulley (6) and said driven pulley (8) at said first setting, and a second phase timing (88) at said second setting, and
a camshaft (80) attached to said driven pulley (8), and a phase shifter (90) for adjusting the timing of said camshaft (80).

8. The endless band drive system of claim 1, wherein said endless band (4) is a belt, and said first guide is rotary belt guide (112).

9. The endless band drive system of claim 1, wherein said endless band system (2) has a range of settings between said first setting and said second setting, wherein said endless band is generally slackless across said range of settings.

10. An endless band drive system (2) having an endless band (4), a drive pulley (6), a first driven pulley (8), and a first guide (10, 44 and 58) in contact with said endless band (4),
said endless band drive system (2) further includes a variable center distance (12) between said drive pulley (6) and said first driven pulley (8), and
a first setting having a first center distance (12*a*) between said drive pulley (6) and said first driven pulley (8), and having a first slackless endless band pathway (14*a*), and a first guide position (16*a*) for providing said first slackless endless band pathway (14*a*), and
a second setting having a second center (12*b*) distance between said drive pulley (6) and said first driven pulley (8), and having a second slackless endless band pathway (14*b*), and a second guide position (16*b*) for providing said second slackless endless band pathway (14*b*),
wherein said endless band drive system (2) further includes a first rotatable control shaft (18, 48 and 62), and a second rotatable control shaft (70) for adjusting the center distance (12) between drive pulley (6) and first driven pulley (8), and for repositioning said first guide (10, 44 and 58) from said first guide position (16*a*) to said second guide position (16*b*) thereby providing a slackless endless band at said first and second endless band positions and for providing a variable center distance between drive pulley (6) and first driven pulley (8).

11. The endless band drive system of claim 10, wherein first rotatable control shaft (18) includes a first guide pin (24), for repositioning of said first guide (10) with rotation of said first rotatable control shaft (18) for providing slackless first and second positions (16*a* and 16*b*),
rotation of said first rotatable control shaft (18) further defines a first control shaft axis (26), and said guide pin (24) further defines a guide pin axis (28), said first guide pin axis (28) being offset from said control shaft axis (26), and
a second guide (72), second rotatable control shaft (70) further including a second guide pin (74) for repositioning of said second guide (72) with rotation of said second rotatable control shaft (70) for providing slackless first and second positions (16*a* and 16*b*),
rotation of said second rotatable control shaft (70) further defines a second control shaft axis (76), and said second guide pin (74) further defines a second guide pin axis (78), said second guide pin axis (78) being offset from said first control shaft axis (76).

12. The endless band drive system of claim 10, wherein said first guide (58) includes a first guide positioning surface (60) and rotatable control shaft (62) includes a first guide cam (64), said first guide cam (64) being in contact with said first guide positioning surface (60) for repositioning of said first guide (58) with rotation of said rotatable control shaft (62).

13. The endless band drive system of claim 10, wherein said first guide (58) has a first guide positioning surface (60) and a first guide cam (64), and said second guide (72) has a second positioning surface and a second guide cam for providing slackless first and second positions.

14. The endless band drive system of claim 12, further having a first phase timing (86) between said drive pulley (6) and said driven pulley (8) at said first setting, and a second phase timing (88) at said second setting, wherein said cam (64) provides said first and second phase timings (86 and 88).

15. The endless band drive system of claim 10, further having a first phase timing (86) between said drive pulley (6) and said driven pulley (8) at said first setting, and a second phase timing (88) at said second setting, and
a camshaft (80) attached to said driven pulley (8), and a phase shifter (90) for adjusting the timing of said camshaft (80).

16. The endless band drive system of claim 10, wherein said endless band (4) is a belt, and said first guide is rotary belt guide (112).

17. The endless band drive system of claim 10, wherein said first guide (44) includes a guide pin slot (46) and first rotatable control shaft (48) includes a guide pin (50), said guide pin (50) being mounted in said slot (46) for repositioning of said first guide (44) with rotation of said first rotatable control shaft (48),
rotation of said first rotatable control shaft (48) further defines a control shaft axis (52), and said guide pin (50)

further defines a guide pin axis (54), said first guide pin axis (54) being offset from said control shaft axis (52).

18. The endless band drive system of claim 10, wherein endless band system (2) further includes an alignment pin (38) and first guide 10 includes a slot (40) for positioning first guide (10) and providing slackless first and second positions (16*a* and 16*b*).

19. The endless band drive system of claim 18, further including a curved slot (43), alignment pin (38) being retained in curved slot (43) for positioning first guide (10) and providing slackless first and second positions (16*a* and 16*b*).

\* \* \* \* \*